(12) United States Patent
Morris

(10) Patent No.: US 6,250,659 B1
(45) Date of Patent: Jun. 26, 2001

(54) VEHICLE VARIABLE HEIGHT ADJUSTMENT ASSEMBLY

(76) Inventor: Christian C. Morris, 4718 E. Abraham La., Scottsdale, AZ (US) 85027

( * ) Notice: Subject to any disclaimer, the term of this patent is extended or adjusted under 35 U.S.C. 154(b) by 0 days.

(21) Appl. No.: 09/198,877

(22) Filed: Nov. 24, 1998

(51) Int. Cl.$^7$ .................................................... B60G 15/00
(52) U.S. Cl. ............................. 280/124.147; 280/124.155
(58) Field of Search ........................ 280/124.1, 124.157, 280/124.159, 124.158, 124.16, 124.161, 124.146, 124.147, 124.148, 124.154, 124.155, 6.15, 6.157, 5.5, FOR 171, 124.145, 124.168

(56) References Cited

U.S. PATENT DOCUMENTS

| | | | |
|---|---|---|---|
| 3,664,681 | * | 5/1972 | Thaxton ......................... 280/124.116 |
| 4,390,187 | * | 6/1983 | Maeda ................................ 280/6.159 |
| 4,826,204 | * | 5/1989 | Cameron ................................ 280/698 |
| 4,883,288 | * | 11/1989 | Finn et al. ............................. 280/672 |
| 5,536,035 | * | 7/1996 | Bautz et al. ........................... 280/660 |

OTHER PUBLICATIONS

Truckin' (sport truck publication), Dec. 1998, vol. 24, No. 12, p. 178 (front air systems) and p. 185 (rear air systems).

* cited by examiner

*Primary Examiner*—Paul N. Dickson
*Assistant Examiner*—Faye M. Fleming

(74) *Attorney, Agent, or Firm*—Ellis, Venable & Busam LLP

(57) ABSTRACT

A vehicle variable height adjustment strut assembly 10 adjusts height of a vehicle 100 and replaces a vehicle strut by being mounted at a vehicle strut mount location. Assembly 10 has a vehicle variable height adjustment system 15, a height adjustment air bag 40, and a shock absorber 50. System 15 includes an air bag strut tower coupler 20 and an air bag control arm coupler 30. Air bag strut tower coupler 20 is mounted to a vehicle strut tower 60, and air bag control arm coupler 30 is coupled to a vehicle control arm 70. Air bag 40 is coupled between the air bag strut tower coupler 20 and the air bag control arm coupler 30. Air bag 40 is inflated and deflated to respectively raise and lower the vehicle 100. An air pressure control system 110 is coupled to the height adjustment air bag(s) 40, and the air pressure control system 110 controls pressure levels of the air bag(s) 40. The shock absorber 50 is coupled to the air bag strut tower coupler 20 and the air bag control arm coupler 30 to provide shock absorption to the vehicle 100. The shock absorber 50 is placed to an offset position relative to the air bag 40. The shock absorber 50 and the air bag 40 also act to provide strut operations for the vehicle 100. Air bag strut tower coupler 20 has a strut tower base mount 22, a support structure 24, and an air bag strut tower base mount 26. The support structure may be a helical support structure 24A or a vertical curved support structure 24B. The control arm coupler 30 generally has a control arm base mount 32 and a control arm mount structure 34. The control arm mount structure 34 may be a fork mount structure 34A and 34B or an insertable mount structure 34C and 34D.

22 Claims, 6 Drawing Sheets

VEHICLE VARIABLE HEIGHT ADJUSTMENT ASSEMBLY

FIELD OF INVENTION

The present invention relates to a vehicle variable height adjustment assembly, and, in particular, to a variable height adjustment assembly that replaces a strut assembly of a vehicle.

BACKGROUND OF INVENTION AND BRIEF DESCRIPTION OF THE PRIOR ART

Some drivers desire a higher or lower ride of their vehicles. Adjustable suspension components have been developed to allow drivers to raise or lower their vehicles as desired. One type of adjustable suspension assembly that has been developed is a hydraulic adjustable suspension system. The hydraulic system generally has hydraulic cylinders and hydraulic pumps and valves wherein the pumps direct fluids into the cylinders to raise the vehicle and the valves release fluids from the cylinders to lower the vehicle. However, these hydraulic systems may have complicated, cumbersome, and a large number of parts and components. These hydraulic systems are typically expensive and at times may not be very reliable due to the large number of interrelated parts and components.

Other adjustable suspension systems were developed such as air bag systems. Air bags are much less expensive than hydraulic systems, and they are typically much easier to install than hydraulic systems. The air bags are configured to replace coil springs, leaf springs, and/or torsion bars for non-strut vehicles (i.e. vehicles with shock absorbers and coil/leaf springs). The trend is that most vehicles use struts rather than the conventional shock absorber/spring suspension systems. However, the air bag systems are not configured to be used with strut vehicles (i.e. vehicles equipped with struts). Therefore, these air bags are limited to being mounted and used only on non-strut vehicles. For example, the strut assembly has a shock component that is typically mounted within a coil spring, and it is very difficult or is not possible or practical to adapt an air bag for use in an existing strut assembly since in order to replace the coil spring with the air bag, the air bag would have to be configured to allow the shock component to go through the air bag or the shock component would have to be offset a distance from the air bag.

Therefore, the present invention discloses and provides an air bag variable height adjustment system that replaces a strut assembly for a vehicle, and the present air bag system overcomes the problems, disadvantages, and limitations of the prior art.

SUMMARY OF INVENTION

Set forth is a brief summary of the invention in order to solve the foregoing problems and achieve the foregoing and other objects, benefits, and advantages in accordance with the purposes of the present invention as embodied and broadly described herein.

It is an object of the invention to provide a vehicle variable height adjustment system that allows coupling of and using a height adjustment air bag that inflates and deflates to respectively raise and lower a vehicle and that also allows coupling of a shock component.

It is another object of the invention to provide a vehicle variable height adjustment system that provides stability to the entire structure and prevents wobbling and shifting of its components.

It is another object of the invention to provide a vehicle variable height adjustment system that is able to couple to an air bag pressure control system.

It is a further object of the invention to provide a vehicle variable height adjustment system that is able to couple to a vehicle strut tower and a vehicle control arm.

It is another object of the invention to provide a vehicle variable height adjustment assembly that replaces an existing strut assembly and that mounts to a general strut location of a vehicle.

It is a further object of the invention to provide a vehicle variable adjustment assembly that operates to adjust the height of a vehicle and that also provides operations of a strut.

It is another object of the invention to provide a vehicle variable height adjustment assembly that has a shock component for providing shock absorption for the vehicle and an air bag component for raising and lowering the vehicle.

It is a further object of the invention to provide a vehicle variable height adjustment assembly wherein the components of the assembly do not interfere with the mounting, positioning, and/or operations of the other parts of the vehicle.

It is another object of the invention to provide a vehicle variable height adjustment assembly having a height adjustment air bag that inflates and deflates to vary vertical distance in order to raise and lower the vehicle.

It is a further object of the invention to provide a vehicle variable height adjustment assembly that has a height adjustment air bag and an air pressure control system for controlling the pressure of the air bag.

It is still another object of the invention to provide a vehicle variable adjustment assembly or system that is inexpensive, light weight, reliable, durable, and relatively simple in components and parts.

The above objects and advantages of the invention are achieved by a vehicle variable height adjustment system. The system allows coupling of and using a height adjustment air bag. The system generally comprises an air bag strut tower coupler and an air bag control arm coupler. The strut tower coupler is adapted to couple to a vehicle strut tower and is also adapted to couple to the height adjustment air bag and a shock absorber. The air bag control arm coupler is adapted to couple to a vehicle control arm and is also adapted to couple to the height adjustment air bag and the shock absorber.

The air bag strut tower coupler further has a strut tower base mount, a support structure, and an air bag strut tower base mount. The strut tower base mount is adapted to mount to the vehicle strut tower. The support structure has an end that is attached to the strut tower base mount. The air bag strut tower base mount is attached to another end of the support structure. The air bag strut tower base mount is adapted to mount to the height adjustment air bag. The support structure may be a helical support structure or a vertical curved support structure. The air bag strut tower base mount has a valve stem access area that allows access to a valve stem of the height adjustment air bag.

An upper shock absorber mount is coupled to the air bag strut tower coupler. The upper shock absorber mount is adapted to couple to the shock absorber. The air bag control arm coupler further has a control arm base mount adapted to couple to the height adjustment air bag. A control arm mount structure is coupled to the control arm base mount wherein the control arm mount structure is adapted to receive and couple to the vehicle control arm. The control arm mount structure is a fork mount structure that is adapted to receive and couple to the vehicle control arm. The fork mount structure has an axle access area for allowing a vehicle axle to be mounted therethrough. The control arm mount structure alternatively may be an insertable mount structure (vertical or horizontal mount structure) that is adapted to receive and couple to the vehicle control arm. A lower shock absorber mount is coupled to the air bag control arm coupler. The lower shock absorber mount is adapted to couple to the shock absorber.

A height adjustment air bag is coupled to the air bag strut tower coupler and the air bag control arm coupler. The height adjustment air bag is inflated and deflated to vary vertical distance between the air bag strut tower coupler and the air bag control arm coupler so that vehicle height is adjusted. An air pressure control system is coupled to the height adjustment air bag, and the air pressure control system controls air bag pressure. A shock absorber is coupled to the air bag strut tower coupler and the air bag control arm coupler. The shock absorber provides vehicle shock absorption.

The above objects and advantages of the invention are also achieved by a method of making a vehicle variable height adjustment system that allows coupling of and using a height adjustment air bag and a shock absorber. An air bag strut tower coupler is provided and adapted to couple to a vehicle strut tower and also adapted to couple to a height adjustment air bag and a shock absorber. An air bag control arm coupler is provided and adapted to couple to a vehicle control arm and also adapted to couple to the height adjustment air bag and the shock absorber. A height adjustment air bag is coupled to the air bag strut tower coupler and the air bag control arm coupler. The height adjustment air bag is inflated and deflated to vary vertical distance between the air bag strut tower coupler and the air bag control arm coupler so that vehicle height is adjusted. A shock absorber is coupled to the air bag strut tower coupler and the air bag control arm coupler to provide vehicle shock absorption.

The above objects and advantages of the invention are further achieved by a vehicle variable height adjustment strut assembly. The assembly has an air bag strut tower coupler, an air bag control arm coupler, a height adjustment air bag, and a shock absorber. The air bag strut tower coupler is adapted to couple to a vehicle strut tower and is coupled to a height adjustment air bag and a shock absorber. The air bag control arm coupler is adapted to couple to a vehicle control arm and is coupled to the height adjustment air bag and the shock absorber. The height adjustment air bag is coupled to the air bag strut tower coupler and the air bag control arm coupler. The height adjustment air bag is inflated and deflated to vary vertical distance between the air bag strut tower coupler and the air bag control arm coupler so that vehicle height is adjusted. The shock absorber is coupled to the air bag strut tower coupler and the air bag control arm coupler to provide vehicle shock absorption.

The above objects and advantages of the invention are also achieved by a method of using a vehicle variable height adjustment strut assembly. The vehicle variable height adjustment strut assembly is provided with an air bag strut tower coupler and an air bag control arm coupler. A height adjustment air bag is coupled between the air bag strut tower coupler and the air bag control arm coupler. A shock absorber is coupled to the air bag strut tower coupler and the air bag control arm coupler to provide vehicle shock absorption. The air bag strut tower coupler and the air bag control arm coupler are mounted to vehicle strut mount locations. The height adjustment air bag is inflated to increase vertical distance between the air bag strut tower coupler and the air bag control arm coupler so that vehicle height is increased, and the height adjustment air bag is deflated to decrease vertical distance between the air bag strut tower coupler and the air bag control arm coupler so that vehicle height is decreased. The air bag strut tower coupler is coupled to a vehicle strut tower, and the air bag control arm coupler is coupled to a vehicle control arm.

DETAILED DESCRIPTION

Figure 1:
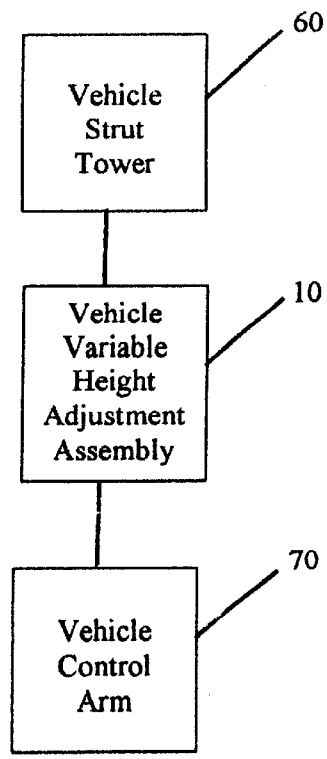
FIG. 1 is a general block diagram of the present invention vehicle variable height adjustment assembly coupled to a vehicle control arm and a vehicle strut tower.
Figure 3:
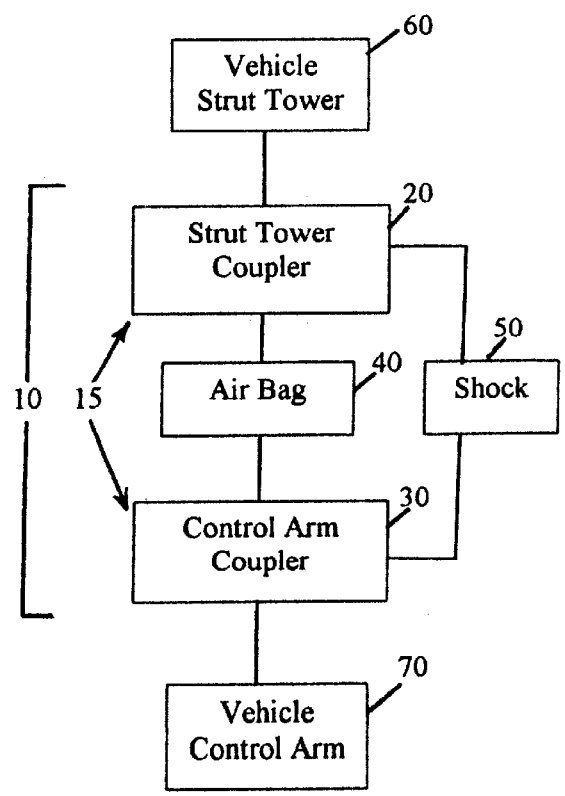
FIG. 3 is a block diagram showing the present invention vehicle variable height adjustment assembly and vehicle variable height adjustment system with its general subsystems coupled to a vehicle control arm and a vehicle strut tower.
Figure 2:
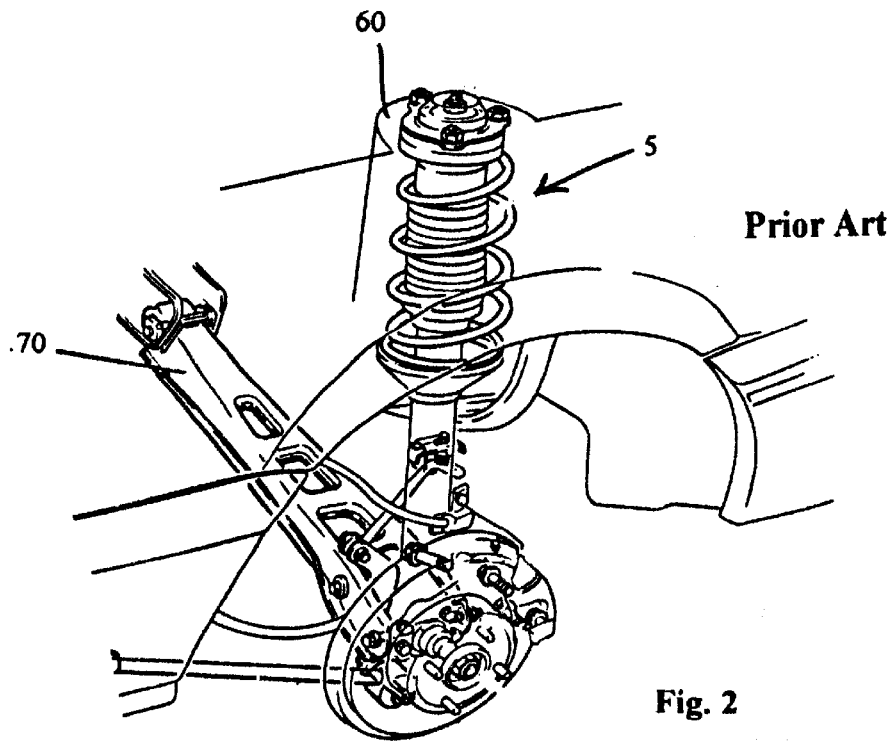
FIG. 2 is a side perspective view of a prior art vehicle strut assembly.

The present invention is a vehicle variable height adjustment assembly 10. The variable height adjustment assembly 10 replaces or is mounted in place of a vehicle strut assembly (FIG. 2 shows a typical prior art vehicle strut assembly 5). The present assembly 10 has a vehicle variable height adjustment system 15 that includes an air bag strut tower coupler 20 and an air bag control arm coupler 30 as shown in FIG. 3. The present assembly 10 also has a height adjustment air bag 40 coupled between the strut tower coupler 20 and the control arm coupler 30, and the present assembly 10 further has a shock absorber 50 which has one end coupled to the strut tower coupler 20 and another end coupled to the control arm coupler 30.

The present assembly 10 is mounted at the location that a strut would normally be mounted, and it is used to lower and raise the height of a vehicle at its suspension system by respectively inflating and deflating the height adjustment air bag 40. The present assembly 10 also operates as strut as well. FIG. 3 also shows that the strut tower coupler 20 of the present assembly 10 or system 15 is coupled to a vehicle strut tower 60 (i.e. the location at which an upper end of a prior art conventional strut would normally be coupled to the vehicle) and further shows that the control arm coupler 30 of the present assembly 10 or system 15 is coupled to a vehicle control arm 70 (i.e. the location at which a lower end of a prior art conventional strut would normally be coupled to the vehicle).

Figures 4, 5:
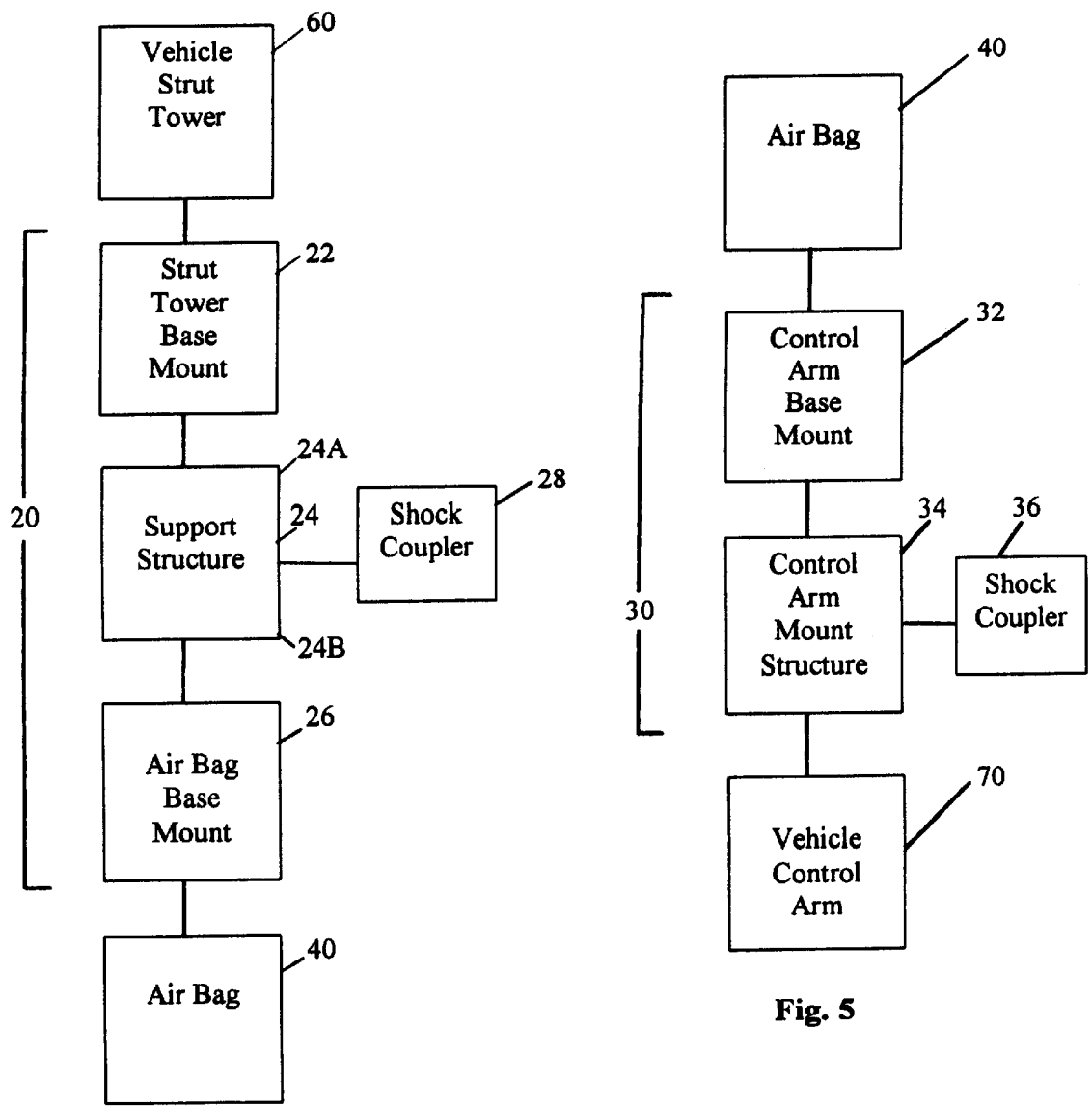
FIG. 4 is a block diagram showing the strut tower coupler for the present invention coupled to a vehicle strut tower and an air bag.
FIG. 5 is a block diagram showing the control arm coupler for the present invention coupled to an air bag and a vehicle control arm.

FIG. 4 shows a more detailed block diagram of the air bag strut tower coupler 20. The strut tower coupler 20 generally has a strut tower base mount 22, a support structure 24, and an air bag strut tower base mount 26. The strut tower base mount 22 is adapted to mount or is mounted to the vehicle strut tower 60. The support structure 24 has one end 24A attached to the strut tower base mount 22. The air bag strut tower base mount 26 is attached to another end 24B of the support structure 24. The air bag strut tower base mount 26 is adapted to mount or is mounted to the height adjustment air bag 40. A shock absorber coupler 28 (i.e. upper shock absorber coupler) is coupled to the support structure 24 to allow an end of a shock absorber 50 to be coupled thereto.

FIG. 5 shows a more detailed block diagram of the air bag control arm coupler 30. The control arm coupler 30 generally has a control arm base mount 32 and a control arm mount structure 34. The control arm base mount 32 is adapted to couple or is coupled to the height adjustment air bag 40. The control arm mount structure 34 is coupled to the control arm base mount 32. The control arm mount structure 34 is adapted to receive and couple to the vehicle control arm 70. A shock absorber coupler 36 (i.e. lower shock absorber coupler) is coupled to the mount structure 34 to allow another end of a shock absorber 50 to be coupled thereto. The shock absorber 50 is therefore coupled to the support structure 24 of the strut tower coupler 20 at the shock absorber coupler 28 and further coupled to the control arm mount structure 34 of the control arm coupler 30 at the shock absorber coupler 36 (i.e. see FIGS. 3, 4, and 5).

Figures 6, 7:
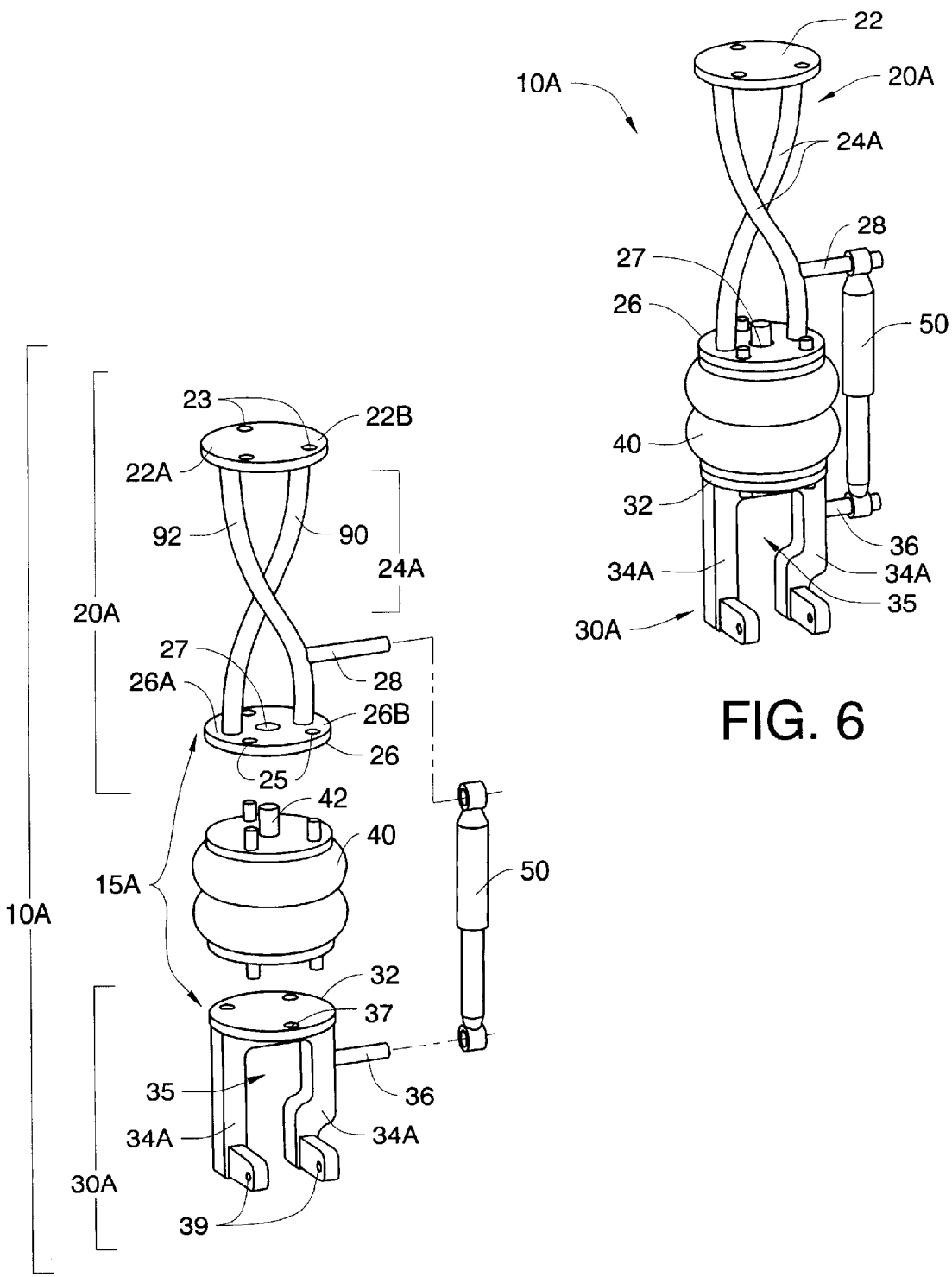
FIG. 6 is a side perspective view of the present invention vehicle variable height adjustment assembly for a typical front strut replacement.
FIG. 7 is an exploded perspective view of the present invention vehicle variable height adjustment assembly of FIG. 6.

FIGS. 6 and 7 show a first embodiment vehicle variable height adjustment assembly 10A. The assembly 10A is typically used as a front strut replacement for a front wheel drive vehicle, but it is not limited in any way to being used in this manner, that is, it is able to replace any suitable strut assembly. The assembly 10A has a vehicle variable height adjustment system 15A. The system 15A has a strut tower coupler 20A and a control arm coupler 30A.

The strut tower coupler 20A has a base mount 22, a support structure 24A, and an air bag strut tower base mount 26. The base mount 22 has mounting holes 23 that are used to mount the strut tower coupler 20A to the strut tower 60. The base mount 26 has coupling holes 25 for coupling and attaching the strut tower coupler 20A to the air bag 40. The base mount 26 further has a valve stem access area 27. The valve stem access area 27 allows a valve stem 42 of the height adjustment air bag 40 to be accessed thereat. The support structure 24A for the strut tower coupler 20A is a helical support structure.

The helical support structure 24A provides a counteracting force structure. The helical support structure 24A has one support member 90 that extends from one side 22B of the base mount 22 to one side 26A of the base mount 26. The helical support structure 24A also has another member 92 that extends from another side 22A of the base mount 22 to another side 26B of the base mount 26. The criss-cross nature of the helical structure 24A allows forces that are applied at one side of a mounting base to be distributed to another side of another mounting base. For example, a force applied at side 22B of mount base 22 will be distributed to side 26A of mount base 26, and a force applied at side 22A of mount base 22 will be distributed to side 26B of mount base 26. The counteracting forces help stabilize and prevent cocking or skewing (i.e. prevent improper positioning and/or misalignment) of the strut tower coupler 20A in relation to the control arm coupler 30A when the assembly 10A is mounted to a vehicle (i.e. when weight or forces is/are applied to the components of the assembly 10A). Therefore, the components of the entire assembly 10A are configured to generally remain in a properly aligned position when being used. Also, the helical support structure 24A allows the entire assembly 10A to fit and properly mount to the vehicle strut locations. A shock absorber coupler 28 is coupled to the helical support structure 24A.

Figure 10:
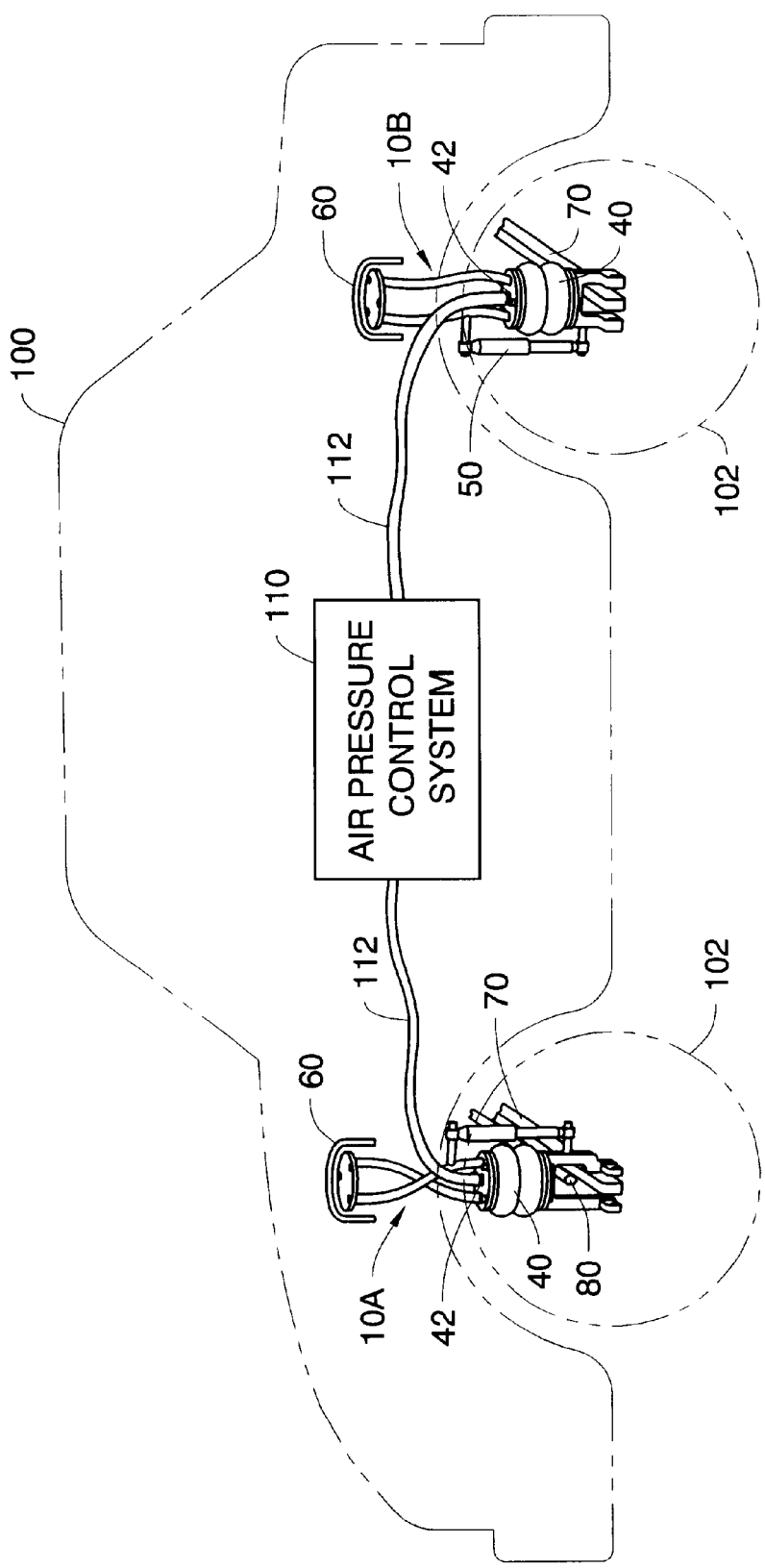
FIG. 10 is a side view of a vehicle with the present invention vehicle variable height adjustment assembly mounted at a front strut location and a rear strut location and with an air pressure control system coupled to each vehicle variable height adjustment assembly.

The control arm coupler 30A has a control arm base mount 32 and a fork mount structure 34A. The fork mount structure 34A is generally an open U-shaped structure as shown in FIGS. 6 and 7. The fork mount structure 34A has an axle access area 35. The axle access area 35 allows a vehicle axle 80 to be mounted therethrough as shown in FIG. 10. The base mount 32 has coupling holes 37 for coupling and attaching the control arm coupler 30A to the air bag 40. The fork mount structure 34A has mounting holes 39 that are used to mount the control arm coupler 30A to the control arm 70. A shock absorber coupler 36 is coupled to the fork mount structure 34A.

The air bag 40 is coupled between the base mount 26 of strut tower coupler 20A and the base mount 32 of the control arm coupler 30A. The valve stem 42 protrudes through the valve stem access area 27 to allow an air pressure control system 110 to be accessed thereat (i.e. see FIGS. 7 and 10). The air bag 40 is generally positioned linearly with the strut tower coupler 20A and the control arm coupler 30A, that is, these components are coupled to generally form a linear structure. The shock absorber 50 is coupled to the helical support structure 24A of the strut tower coupler 20A and the fork mount structure 34A of the control arm coupler 30A. The shock absorber 50 is mounted so that it is located off to a side and parallel to the linear structure formed by strut tower coupler 20A, air bag 40, and control arm coupler 30A. The shock absorber 50 is placed off to the side so that it is out of the way of the other components. The shock absorber 50 also acts to further couple the coupler 20A, the air bag 40, and the coupler 30A together thereby providing stability to the entire structure and preventing wobbling and shifting of the strut tower coupler 20A and the control arm coupler 30A in relation to each other when they are coupled to the air bag 40. The shock absorber 50 and the air bag 40 also act to provide strut operations. The base mount 22 is mounted to the vehicle strut tower 60, and the control arm 70 is coupled to the fork mount structure 34A at its mounting holes 39. The assembly 10A is mounted and used in the same general manner as described above for the assembly 10.

Figures 8, 9:
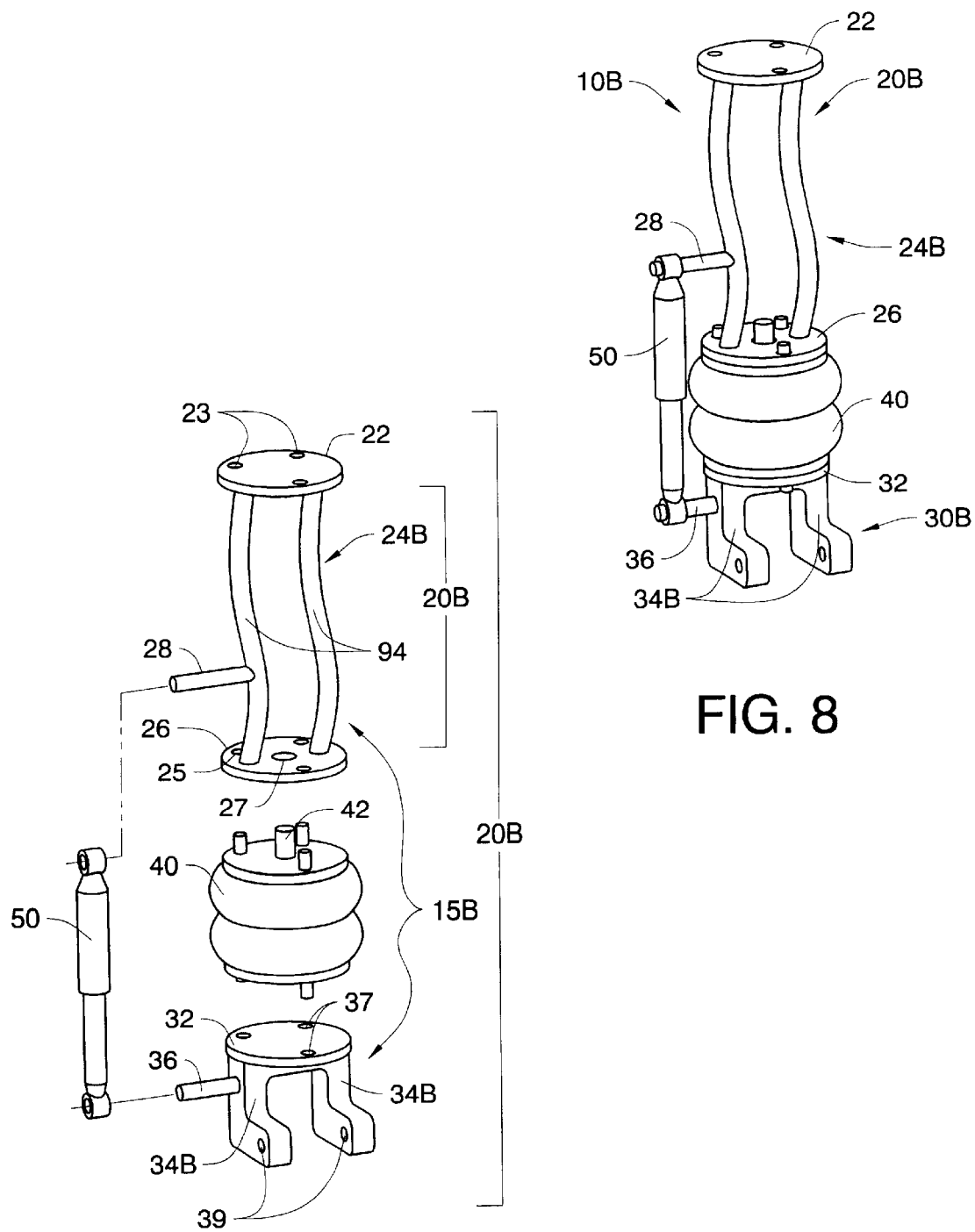
FIG. 8 is a side perspective view of the present invention vehicle variable height adjustment assembly for a typical rear strut replacement.
FIG. 9 is an exploded perspective view of the present invention vehicle variable height adjustment assembly of FIG. 8.

FIGS. 8 and 9 show a second embodiment vehicle variable height adjustment assembly 10B. The assembly 10B is typically used as a rear strut replacement for a front wheel drive vehicle, but it is not limited in any way to being used in this manner, that is, it is able to replace any suitable strut assembly. The assembly 10B has a vehicle variable height adjustment system 15B. The system 15B has a strut tower coupler 20B and a control arm coupler 30B.

The strut tower coupler 20B has a base mount 22, a support structure 24B, and an air bag strut tower base mount 26. The base mount 22 has mounting holes 23 that are used to mount the strut tower coupler 20B to the strut tower 60. The base mount 26 has coupling holes 25 for coupling and attaching the strut tower coupler 20B to the air bag 40. The base mount 26 further has a valve stem access area 27. The valve stem access area 27 allows a valve stem 42 of the height adjustment air bag 40 to be accessed thereat. The support structure 24B for the strut tower coupler 20B is a vertical curved support structure.

The vertical curved support structure 24B provides a stabilizing force structure. The vertical curved support structure 24B has two curved generally S-shaped support members 94 positioned parallel to each other. The members 94 are curved so that the entire assembly 10B fits and properly mounts to the vehicle strut locations. The curved support structure 24B also acts to stabilize and prevent improper positioning and/or misalignment of the strut tower coupler 20B in relation to the control arm coupler 30B when the assembly 10B is mounted to a vehicle (i.e. when weight or forces is/are applied to the components of the assembly 10B). Therefore, the components of the entire assembly 10B are configured to generally remain in a properly aligned position when being used. A shock absorber coupler 28 is coupled to the curved support structure 24B.

The control arm coupler 30B has a control arm base mount 32 and a fork mount structure 34B. The fork mount structure 34B is generally an open U-shaped structure as shown in FIGS. 8 and 9. The base mount 32 has coupling holes 37 for coupling and attaching the control arm coupler 30B to the air bag 40. The fork mount structure 34B has mounting holes 39 that are used to mount the control arm coupler 30B to the control arm 70. A shock absorber coupler 36 is coupled to the fork mount structure 34B.

The air bag 40 is coupled between the base mount 26 of strut tower coupler 20B and the base mount 32 of the control arm coupler 30B. The valve stem 42 protrudes through the valve stem access area 27 to allow an air pressure control system 110 to be accessed thereat (i.e. see FIGS. 9 and 10). The air bag 40 is in general alignment with the strut tower coupler 20B and the control arm coupler 30B. The shock absorber 50 is coupled to the curved support structure 24B of the strut tower coupler 20B and the fork mount structure 34B of the control arm coupler 30B. The shock absorber 50 is mounted so that it is located off to a side and parallel to the aligned structure formed by strut tower coupler 20B, air bag 40, and control arm coupler 30B. The shock absorber 50 is placed off to the side so that it is out of the way of the other components. The shock absorber 50 also acts to further couple the coupler 20B, the air bag 40, and the coupler 30B together thereby providing stability to the entire structure and preventing wobbling and shifting of the strut tower coupler 20B and the control arm coupler 30B in relation to each other when they are coupled to the air bag 40. The base mount 22 is mounted to the vehicle strut tower 60, and the control arm 70 is coupled to the fork mount structure 34B at its mounting holes 39. The assembly 10B is mounted and used in the same general manner as described above for the assembly 10.

A vehicle variable height adjustment strut assembly 10 is mounted at a location where the strut would normally be mounted at each wheel 102 of vehicle 100. An air pressure control system(s) 110 is/are coupled to the variable height adjustment strut assemblies 10 at their respective valve stems 42 of the air bags 40 via air hoses 112 as shown in FIG. 10. The air pressure control system 110 can be made part of the variable height adjustment strut assembly 10 (i.e. mounted on the vehicle 100 with the assembly 10), or the air pressure of the air bags 40 of the assemblies 10 may be manually controlled using an outside or external air pressure control system (i.e. not shown). The air pressure control system 110 controls to inflate the height adjustment air bag 40 to increase vertical distance between the air bag strut tower coupler 20 and the air bag control arm coupler 30 so that vehicle height is increased (i.e. vehicle 100 is raised). The air pressure control system 110 also controls to deflate the height adjustment air bag 40 to decrease vertical distance between the air bag strut tower coupler 20 and the air bag control arm coupler 30 so that vehicle height is decreased (i.e. vehicle 100 is lowered). Furthermore, the air pressure control system(s) 110 is/are able to control the air pressure of all of the assemblies 10 in unison (i.e. adjust the air pressure of each air bag 40 at the same time and the same level), or the air pressure control system(s) 110 is/are able to control the air pressure of the assemblies 10 independently or individually (i.e. adjust the air pressure of each air bag 40 to varying or different levels).

Figure 11:
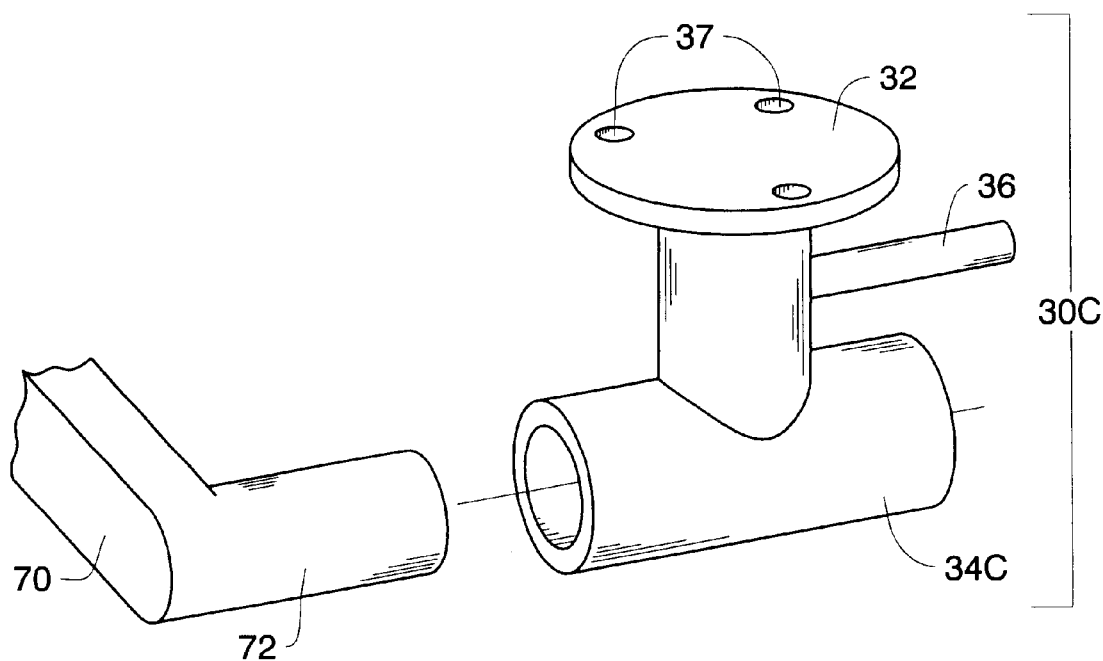
FIG. 11 shows a second embodiment control arm coupler having a horizontally insertable mount structure.
Figure 12:
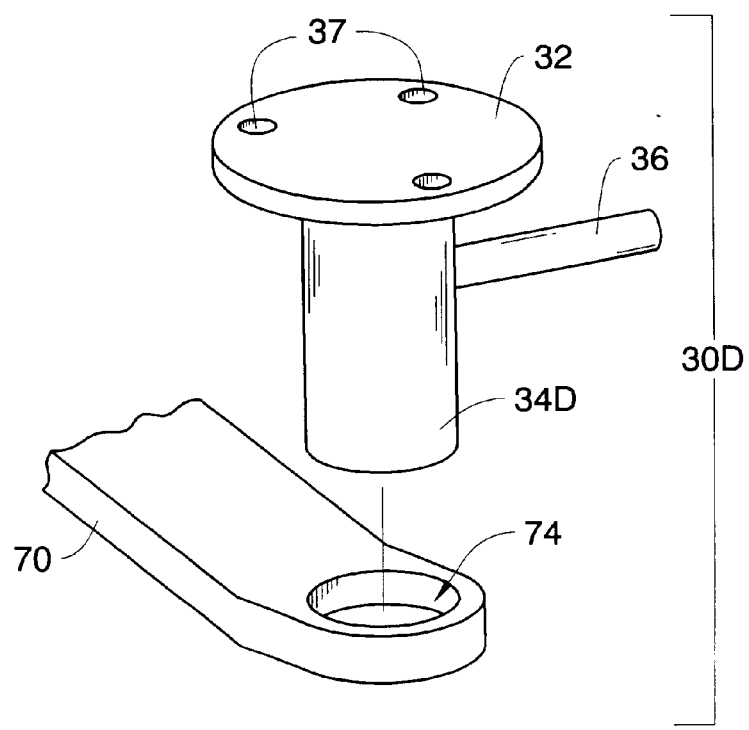
FIG. 12 shows a third embodiment control arm coupler having a vertically insertable mount structure.

Control arm couplers 30A and 30B are two embodiments of the control arm coupler 30 that were described earlier. Control arm couplers 30A and 30B have control arm mount structures that are fork mount structures. Another type of control arm mount structure for a control arm coupler 30 is an insertable mount arm coupler as shown in FIGS. 11 and 12. FIG. 11 shows a control arm coupler 30C that has a horizontally insertable mount structure 34C. A control arm 70 that has a horizontally mountable structure 72 is inserted horizontally and coupled into the horizontally insertable mount structure 34C. FIG. 12 shows a control arm coupler 30D that has a vertically insertable mount structure 34D. A control arm 70 that has a vertically mountable structure 74 is inserted vertically and coupled into the vertically insertable mount structure 34D.

The preferred embodiment of the invention is described above in the Figures and Detailed Description. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application and to enable others skilled in the art to best utilize the invention in various embodiments and with various modifications as are suited to the particular use contemplated.

What is claimed is:

1. A vehicle variable height adjustment system that allows coupling of and using a height adjustment air bag and a shock absorber comprising:

an air bag strut tower coupler adapted to couple to a vehicle strut tower and also adapted to couple to the height adjustment air bag and the shock absorber, and an air bag control arm coupler adapted to couple to a vehicle control arm and also adapted to couple to the height adjustment air bag and the shock absorber.

2. The vehicle variable height adjustment system according to claim 1 wherein the air bag strut tower coupler further comprises:

a strut tower base mount adapted to mount to the vehicle strut tower, a support structure wherein an end of the support structure is attached to the strut tower base mount, and an air bag strut tower base mount attached to another end of the support structure wherein the air bag strut tower base mount is adapted to mount to the height adjustment air bag.

3. The vehicle variable height adjustment system according to claim 2 wherein the support structure is a helical support structure.

4. The vehicle variable height adjustment system according to claim 2 wherein the support structure is a vertical curved support structure.

5. The vehicle variable height adjustment system according to claim 2 wherein the air bag strut tower base mount further comprises a valve stem access area that allows access to a valve stem of the height adjustment air bag.

6. The vehicle variable height adjustment system according to claim 1 further comprises:

an upper shock absorber mount coupled to the air bag strut tower coupler wherein the upper shock absorber mount is adapted to couple to the shock absorber.

7. The vehicle variable height adjustment system according to claim 1 wherein the air bag control arm coupler further comprises:

a control arm base mount adapted to couple to the height adjustment air bag, and a control arm mount structure coupled to the control arm base mount wherein the control arm mount structure is adapted to receive and couple to the vehicle control arm.

8. The vehicle variable height adjustment system according to claim 7 wherein the control arm mount structure is a fork mount structure that is adapted to receive and couple to the vehicle control arm.

9. The vehicle variable height adjustment system according to claim 8 wherein the fork mount structure further comprises:

an axle access area for allowing a vehicle axle to be mounted therethrough.

10. The vehicle variable height adjustment system according to claim 7 wherein the control arm mount structure is an insertable mount structure that is adapted to receive and couple to the vehicle control arm.

11. The vehicle variable height adjustment system according to claim 10 wherein the insertable mount structure is a vertically insertable mount structure.

12. The vehicle variable height adjustment system according to claim 10 wherein the insertable mount structure is a horizontally insertable mount structure.

13. The vehicle variable height adjustment system according to claim 1 further comprises:

a lower shock absorber mount coupled to the air bag control arm coupler wherein the lower shock absorber mount is adapted to couple to the shock absorber.

14. The vehicle variable height adjustment system according to claim 1 further comprises:

a height adjustment air bag coupled to the air bag strut tower coupler and the air bag control arm coupler wherein the height adjustment air bag is inflated and deflated to vary vertical distance between the air bag strut tower coupler and the air bag control arm coupler so that vehicle height is adjusted.

15. The vehicle variable height adjustment system according to claim 14 further comprises:

an air pressure control system coupled to the height adjustment air bag wherein the air pressure control system controls pressure of the air bag.

16. The vehicle variable height adjustment system according to claim 1 further comprises:

a shock absorber coupled to the air bag strut tower coupler and the air bag control arm coupler to provide vehicle shock absorption.

17. A method of making a vehicle variable height adjustment system that allows coupling of and using a height adjustment air bag and a shock absorber comprising the steps of:

providing an air bag strut tower coupler adapted to couple to a vehicle strut tower and also adapted to couple to the height adjustment air bag and the shock absorber, and providing an air bag control arm coupler adapted to couple to a vehicle control arm and also adapted to couple to the height adjustment air bag and the shock absorber.

18. The method of making a vehicle variable height adjustment system according to claim 17 further comprising the step of:

coupling a height adjustment air bag to the air bag strut tower coupler and the air bag control arm coupler wherein the height adjustment air bag is inflated and deflated to vary vertical distance between the air bag strut tower coupler and the air bag control arm coupler so that vehicle height is adjusted.

19. The method of making a vehicle variable height adjustment system according to claim 17 further comprising the step of:

coupling a shock absorber to the air bag strut tower coupler and the air bag control arm coupler to provide vehicle shock absorption.

20. A vehicle variable height adjustment strut assembly wherein the assembly adjusts height of a vehicle and provides strut operations to the vehicle comprising:

an air bag strut tower coupler adapted to couple to a vehicle strut tower and coupled to a height adjustment air bag and a shock absorber, an air bag control arm coupler adapted to couple to a vehicle control arm and coupled to the height adjustment air bag and the shock absorber, wherein the height adjustment air bag is coupled to the air bag strut tower coupler and the air bag control arm coupler and the height adjustment air bag is inflated and deflated to vary vertical distance between the air bag strut tower coupler and the air bag control arm coupler so that vehicle height is adjusted, and wherein the shock absorber is coupled to the air bag strut tower coupler and the air bag control arm coupler to provide vehicle shock absorption.

21. A method of using a vehicle variable height adjustment strut assembly comprising the steps of:

providing the vehicle variable height adjustment strut assembly with an air bag strut tower coupler and an air bag control arm coupler, coupling a height adjustment air bag between the air bag strut tower coupler and the air bag control arm coupler, coupling a shock absorber to the air bag strut tower coupler and the air bag control arm coupler to provide vehicle shock absorption, mounting the air bag strut tower coupler and the air bag control arm coupler to vehicle strut mount locations, inflating the height adjustment air bag to increase vertical distance between the air bag strut tower coupler and the air bag control arm coupler so that vehicle height is increased, and deflating the height adjustment air bag to decrease vertical distance between the air bag strut tower coupler and the air bag control arm coupler so that vehicle height is decreased.

22. The method of using a vehicle variable height adjustment strut assembly according to claim 21 wherein the mounting step further comprises the steps of:

coupling the air bag strut tower coupler to a vehicle strut tower, and coupling the air bag control arm coupler to a vehicle control arm.

\* \* \* \* \*